United States Patent [19]
Hampton et al.

[11] 3,901,075
[45] Aug. 26, 1975

[54] ACOUSTIC VELOCIMETER FOR OCEAN BOTTOM CORING APPARATUS

[75] Inventors: Loyd D. Hampton, Austin; Donald J. Shirley, Leander, both of Tex.

[73] Assignee: The United States of America as represented by the Secretary of the Navy, Washington, D.C.

[22] Filed: Jan. 10, 1974

[21] Appl. No.: 432,384

[52] U.S. Cl. ............... 73/170 A; 73/153; 175/5; 175/20; 175/46; 175/50
[51] Int. Cl.² .................................. E21B 49/02
[58] Field of Search ........ 73/153, 170 A; 175/5, 50, 175/58, 20, 46

[56] References Cited
UNITED STATES PATENTS

| | | | |
|---|---|---|---|
| 2,555,275 | 5/1951 | Millison | 73/153 |
| 2,573,390 | 10/1951 | Blanchard | 73/153 |
| 2,963,641 | 12/1960 | Nanz | 73/153 |
| 3,545,266 | 12/1970 | Wilson | 73/151 |

*Primary Examiner*—James J. Gill
*Assistant Examiner*—Anthony V. Ciarlante
*Attorney, Agent, or Firm*—R. S. Sciascia; R. E. O'Neill

[57] ABSTRACT

The invention disclosed herein deals with in situ measurement of the acoustical properties of the ocean floor while ocean sediment core samples are being obtained and specifically provides means for generating a sound wave. A record is made of the sound transmission characteristics of the core sample as a true representation of the ocean floor in its natural state in that location.

10 Claims, 3 Drawing Figures

ACOUSTIC VELOCIMETER FOR OCEAN BOTTOM CORING APPARATUS

The invention described herein may be manufactured and used by or for the Government of the United States of America for governmental purposes without the payment of any royalties thereon or therefor.

One of the more useful tools that an oceanographer has at his disposal is the sediment corer. For deep ocean work, the gravity corer or piston corer is used whereas for shallow water (20 m or less) a small corer operated either by a diver or from the surface is used. Whichever type is used, the tool allows a vertical section of unconsolidated bottom sediments to be brought to the surface for analysis and testing. The determination of sound speed in bottom sediments is of interest at this time because of the range of applications of underwater acoustics. Because of changes in pressure, temperature, and mechanical properties of the sediment caused by removal of the core from the bottom and its transport to the laboratory, this one property of sediments lends itself least to in-lab determination. Consequently, efforts have been made to measure sediment acoustic properties in situ. For example, Hamilton (1963) reported the determination of sediment sound speeds in situ by attaching acoustic probes to the underwater vehicle TRIESTE and using this vehicle to position the probes in the bottom. Berin and Clay (1967) reported the development of a free fall vehicle which would insert acoustic probes and a short corer into the bottom and, after recording data, ascend to the surface leaving the weighted section on the bottom. Lewis, Nacci, and Gallagher (1970) reported development of yet another ocean bottom vehicle, this one consisting of a platform to be lowered to the ocean bottom, and containing acoustic probes and a corer to be driven into the bottom by electric motors, the whole package being retrieved from the surface after recording data. These are but examples of the many approaches that can be and have been made in determining acoustic properties in situ. These various approaches have several drawbacks, the main one being that they are limited to rather shallow penetration of the ocean bottom. It would be desirable to have in situ acoustic data to at least the same depth that one could core. This invention describes a system for attachment to existing coring tools to obtain the sound speed profiles as the corer penetrates the bottom.

It is therefore an object of this invention to provide an improved ocean corer for obtaining physical characteristics of the ocean floor.

It is still a further object of this invention to provide means for measuring the acoustic properties of the ocean floor.

It is still a further object of this invention to provide a device which includes a sound emitter and a sound receiver positioned on a major diameter of a corer head for transmitting and receiving acoustical signals across the major diameter of the inner portion of the corer head.

Yet a further object of this invention is to provide an improved device for measuring the acoustic characteristics of the ocean floor, comprising: first and second apertures in any designated coring head positioned at opposite ends of a major diameter of the coring head, a sound transducer mounted in the first aperture and a sound receiver mounted in the second aperture, the sound projector designed to project sound towards the sound receiver, the sound projector and sound receiver mounted in material holding them in the aperture, electrical circuitry coupled to the sound transmitter for generating an acoustical signal in the high acoustical range, means for modulating the high acoustical signal in the electrical circuitry to cause the sound projector to emit sound in bursts of acoustical energy at a repetition rate which is related to the time of passage of acoustical signals across the major diameter of the coring head.

Other objects, advantages and novel features of the invention will become apparent from the following detailed description of the invention when considered in conjunction with the accompanying drawings wherein.

Figure 1:
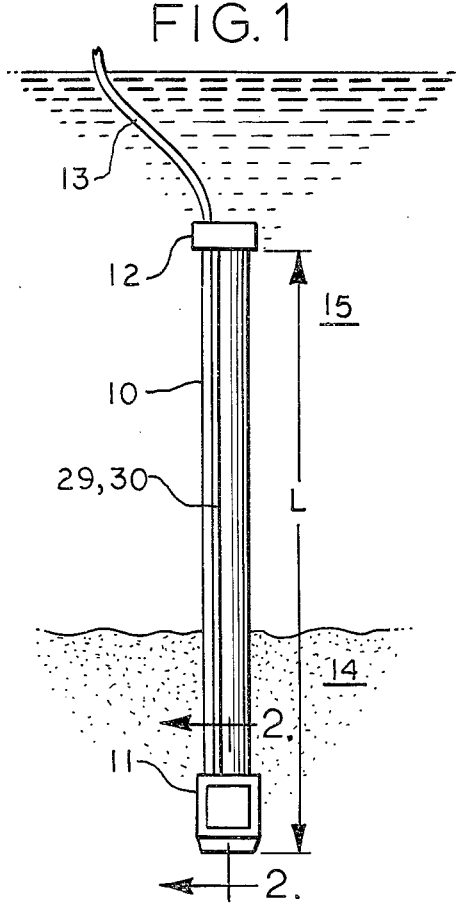
FIG. 1, is an overall view of a typical ocean core sampling device.

FIG. 1, is an overall view of an ocean corer embodying the invention disclosed herein which is shown in a descending sample taking position mode. Generally, it includes a corer barrel 10 having a coring head 11 and an electronics package 12; the entire corer is attached via line 13 to a remotely located (not shown) vehicle for this test work. The head 11 and a portion of the barrel 10 are shown in the ocean sediment 14 below the surface of the water 15. The overall length designated by L is designed so that the corer barrel will hold a given length of ocean sediment that can be removed from the ocean bottom and at a later time and later place will give the oceanographer an analysis of the sediment at that point. It should be noted that cables 29 and 30 connect the coring head projector and receiver to the electronics package 12.

Figure 2:
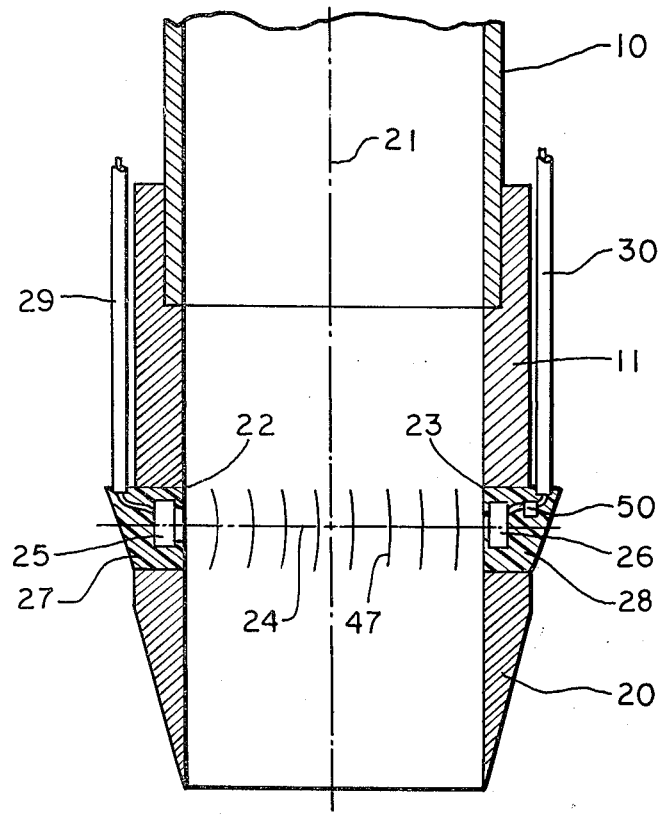
FIG. 2, is a cross sectional view along lines 2—2 in FIG. 1 showing the details of a typical coring head.

FIG. 2, is a cross section of the corer barrel 10 and corer head 11 of FIG. 1. The barrel 10 is shown holding the head 11 which has a conically tapered end portion 20 that aids in cutting thru the ocean sediment which would then be retained within the hollow portion of the head and barrel of the corer. The sediment is not shown within the corer for the sake of clarity but during operation hollow portion along the axis 21 of the barrel and head of the corer would fill with sediment.

A pair of apertures 22 and 23 are shown positioned in head 11 on a diameter 24 of the head. A sound projector 25 and a sound receiver 26 are mounted in apertures 22 and 23 along axis 24 and in this embodiment of the invention mounted in the head by epoxy matrixes 27, 28. Cable 29 coupled to the sound projector and cable 30 coupled to the sound receiver are shown and run to the electronics package 12.

Figure 3:
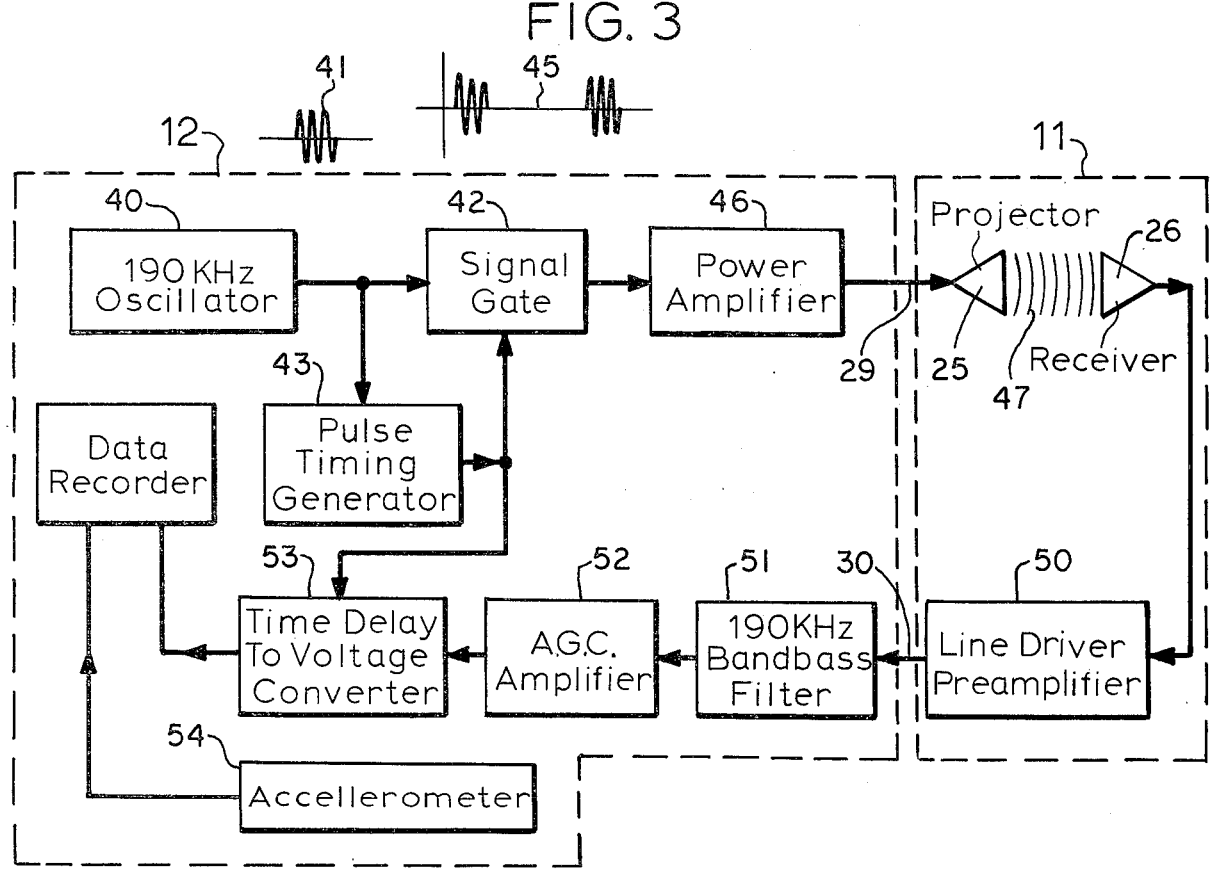
FIG. 3, is a block diagram showing the principal electronic elements of the invention.

FIG. 3, shows projector 25 and receiver 26 located in the head 11 designated by the dashed box. Electronics package 12 containing the necessary electronics to generate the necessary acoustical signals and to process the signals received by the receiver 26 is designated by the dashed line 12.

Block 40 is shown as a 190 kilohertz oscillator which puts out a continuous sine wave 41 coupled to a signal gate 42 and a pulse timing circuit 43. The pulse timing gate generator 43 controls the output of signal gate 42 and a signal burst is generated at a pre-determined repetition rate as shown by 45. A power amplifier 46 receives the gated signal and drives the projector 25. Acoustical signals 47 are projected along axis 24 to receiver 26. The received signal is coupled to a line driver preamplifier 50, there to a 190 kilohertz band pass filter 51, through an automatic gain control amplifier 52 to a time delay to voltage converter 53. Converter 53 is connected to the pulse timing generator 43 for signal processing.

A nominal carrier frequency of 190 kilohertz was chosen as a compromise between attenuation and timing accuracy. Attenuation by scattering and absorption in the sediment decreases with decreasing frequency but the accuracy with which the leading edge of a pulse can be measured also decreases.

When used with a 3 inch diameter corer, the pulse repetition rate of the system is limited to about 200 pulses per second because of reverberation inside the cutter head when the attenuation is low (such as when only water is in the head). This repetition rate gave a spacing between measurements of about every 2 inch (5 cm) when the technique was used to obtain a 30 ft (9 m) penetration with a piston corer. Total penetration time was slightly less than 1 second. For the frequency selected, transducer separation must be at least 2.5 in (6.4 cm) so as to eliminate overlap between the transmit and receive electrical signals (there is some feedover because of the close proximity of the elements). This necessitates the present system being used on the larger type coring tools. However, an increase in frequency with corresponding decrease in pulse length could be effected for use on smaller diameter tools.

The electronics package contains an accelerometer 54 to measure deceleration of the corer as it impacts the bottom. The output of the accelerometer can be integrated twice to provide depth of penetration versus time, for the sound speed profile.

In one successful embodiment of the invention in the transmit section a 190 kilohertz sine wave oscillator was used which provided a cw signal to a signal gate and to the pulse timing circuitry. The pulse time circuit 43 output is a square pulse at the proper repetition rate whose leading and trailing edges are coincident with a positive going zero crossing of the oscillator sine wave. The square pulse is used to open and close the electronic signal gate to provide a coherent sine pulse to the power amplifier. The power amplifier 46 drives the projector transducer with about 15 W of power.

On the receive side, the preamplifier 50 amplifies the signal from the receive transducer 4 dB and transforms the high impedance of the transducer to a low impedance to drive the electronic circuitry. The signal is band-pass filtered and set to an AGC amplifier. The AGC amplifier maintains the incoming signal at about 0.1 V rms over a 15 dB range of input signal variation. The signal then goes to the time delay to voltage converter, which consists of a Miller integrator circuit which is turned on by the transmit pulse and turned off by the received pulse. The circuit integrates a constant voltage so the output is a linear ramp whose length is dependent upon the time delay between pulses. The integrator is followed by two sample and hold circuits one sampling and holding the maximum voltage the ramp reaches, the other sampling the output of the first after it starts to hold. The result is a voltage output linearly dependent on the time delay between pulses.

All circuits are implemented with printed circuit techniques and with integrated circuits where possible so that the whole electronics package requires about 800 cm$^3$ of space exclusive of power supply and recording instrumentation. This volume is not an absolute minimum since further space would be saved through refinement of circuit construction.

Obviously many modifications and variations of the present invention are possible in the light of the above teachings. It is therefore to be understood that within the scope of the appended claims the invention may be practiced otherwise than as specifically described.

We claim

1. An improved acoustic velocimeter coring head apparatus for collecting bottom sediment samples from bodies of water, comprising:
    a. first and second apertures in a coring head spaced from each other; said coring head adapted to be carried by a coring device;
    b. a sound generator in said first aperture;
    c. a sound receiver in said second aperture;
    d. first electrical circuitry connected to said generator to cause said generator to produce sound pulses, and;
    e. second electrical circuitry connected to said sound receiver to measure the received sound pulses.

2. The improved apparatus of claim 1 wherein said first and second apertures are at opposite ends of a diameter of a corer head.

3. The improved apparatus of claim 2 wherein said generator and receiver are positioned on said diameter and said generator projects sound pulses along said diameter.

4. The improved apparatus of claim 3 wherein said electrical circuitry is mounted in a waterproof package mounted remotely on said coring device and connected to said generator and said receiver by a cable.

5. The improved apparatus of claim 4 wherein a preamplifier is mounted on said coring head, adjacent to and connected to said receiver to amplify the received signal for transmission of said electronics package along said cable.

6. The improved apparatus of claim 5 wherein said first electrical circuitry includes an oscillator for generating an electrical signal as a first signal and a gating circuit to pulse said signal at a rate to allow successive pulses of acoustical energy from said generator to traverse said diameter before the next pulse is generated.

7. The improved apparatus of claim 6 wherein an accelerometer's output is connected to said second electrical circuit to give position of said sound pulses with respect to the position of the corer head as it passes through the sediment.

8. An improved acoustic velocimeter coring head apparatus for ocean bottom coring comprising;
    a. a pair of apertures in a coring head on an axis at right angles to said corer head and to the corer barrel on which said corer head is mounted;
    b. a removable acoustical projector mounted on the first of said apertures for producing a sound wave along said axis to said second aperture;
    c. a removable receiver in said second aperture for receiving acoustical signals from said projector;
    d. means for holding said projector and receiver individually in said apertures;
    e. means remotely located from said projector for generating electrical signals coupled to said projector;

f. means remotely located coupled to said receiver for receiving signals from said receiver and generating an output coupled to said receiver; and, g. means for measuring the time difference between projection of the sound and receiving of the sound.

9. The device of claim 8 wherein there is provided an oscillator for generating an electrical signal which is fed to a modulator circuit for pulsing said signals for generating an acoustical signal from said projector whose repetition rate is such that there is not more than one projected signal pulse travelling towards the receiver at one time.

10. The device of claim 9 wherein said time measuring means includes an accelerometer on said corer which is coupled to the receiving circuitry so that the depth of the corer is related to transmitted signals.

* * * * *